United States Patent
Cunningham

[11] 3,721,411
[45] March 20, 1973

[54] RESILIENT MOTOR MOUNTING ARRANGEMENT

[75] Inventor: Eldon R. Cunningham, Fort Wayne, Ind.

[73] Assignee: General Electric Company

[22] Filed: March 30, 1971

[21] Appl. No.: 129,444

[52] U.S. Cl. ................................................248/26
[51] Int. Cl. ............................................F16m 13/00
[58] Field of Search...........................................248/26

[56] References Cited

UNITED STATES PATENTS

| | | | |
|---|---|---|---|
| 2,840,329 | 6/1958 | Wightman | 248/26 |
| 3,012,743 | 12/1961 | Jenkins | 248/26 |
| 2,883,132 | 4/1959 | Neher | 248/26 |
| 3,235,207 | 2/1966 | Church | 248/26 |
| 2,652,997 | 9/1953 | Ballman | 248/26 |
| 2,904,289 | 9/1959 | Refice | 248/26 |

Primary Examiner—William H. Schultz
Attorney—John M. Stoudt, Radford M. Reams, Ralph E. Krisher, Jr., Allard A. Braddock, Joseph B. Forman, Frank L. Neuhauser and Oscar B. Waddell

[57] ABSTRACT

A resilient mounting arrangement for a rotating machine, such as a motor, includes an annulus of resilient material having an inner region forming a bore with a number of recesses extending outwardly from the bore. A rigid member is provided to be positioned within the bore and to be in engagement with the rotating machine. The rigid member includes a number of spaced apart tabs which are received in corresponding recesses and have opposed lateral surfaces for engaging the resilient material forming the recesses. At least some of the tabs are nonplanar to increase the effective length of their lateral surfaces within the recesses.

3 Claims, 7 Drawing Figures

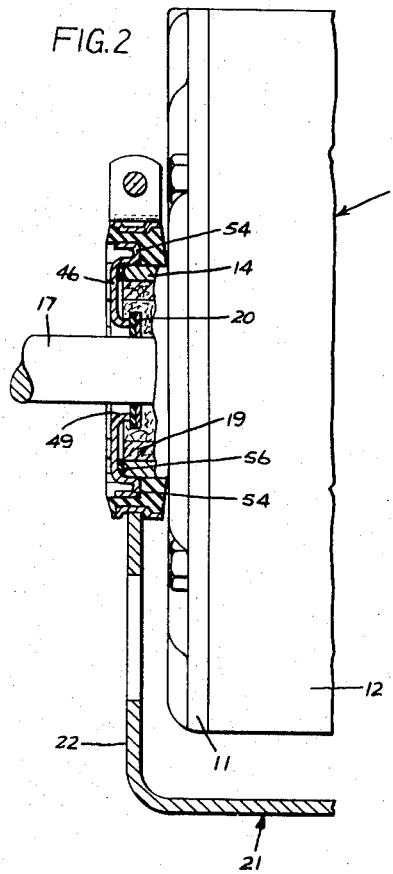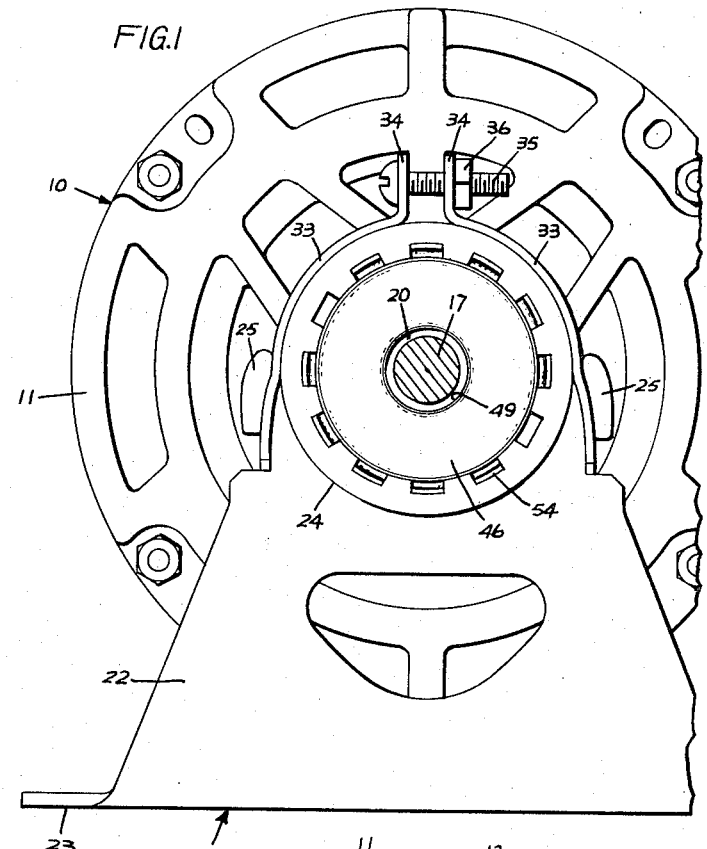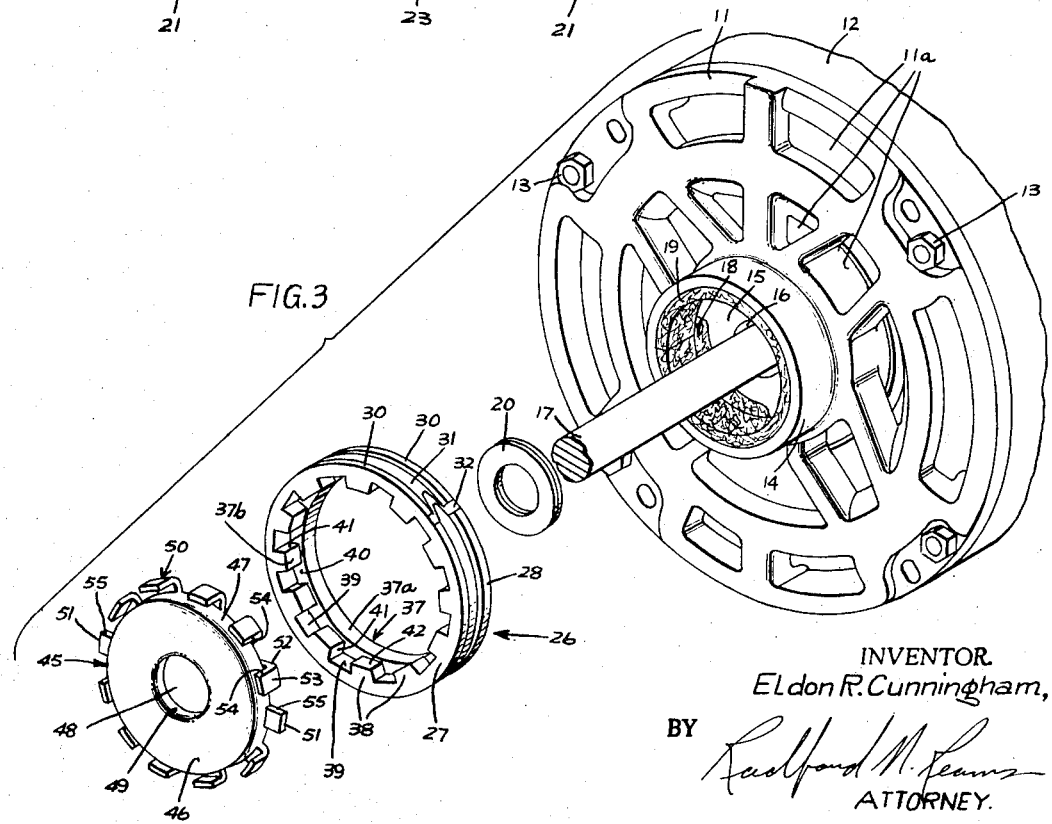

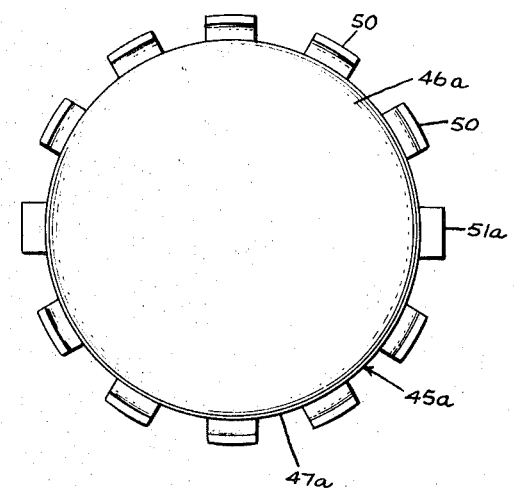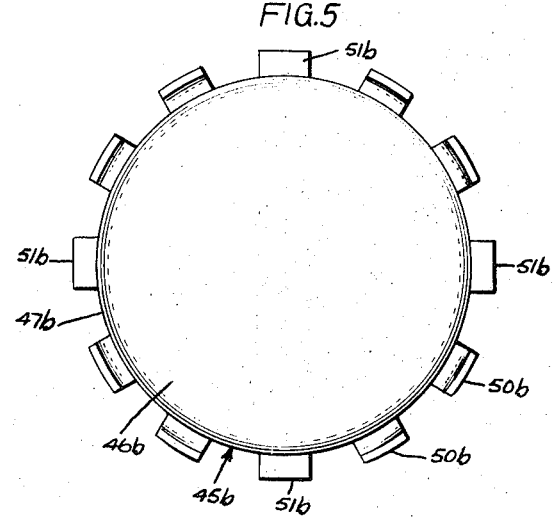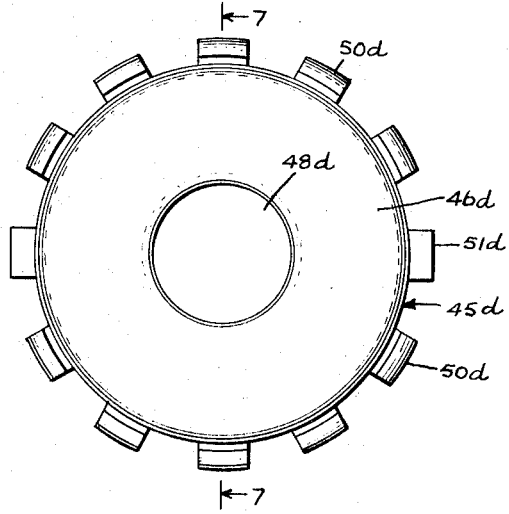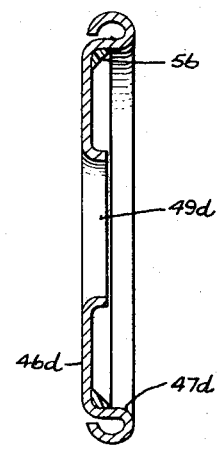

RESILIENT MOTOR MOUNTING ARRANGEMENT

BACKGROUND OF THE INVENTION

This invention relates in general to an improved motor mounting arrangement and more particularly to an improved vibration isolating resilient mounting arrangement for supporting electric motors and the like which reduces the transmission of vibration and noise producing forces to an associated stationary supporting structure.

Transfer of vibrations and operational noises of electric motors from the motor frame to the motor supporting structure is a well-known problem. This is particularly true for small electric motors intended for domestic or office use for example. The motors normally operate in relatively quiet environments and such vibrations and operational noises, if transferred to the motor support structure, can be very annoying. Such motors normally include a frame supporting a rotor and stator for relative rotation, the frame in turn being supported on a stationary structure such as a mounting base or the like. A troublesome source of noise and vibration in such motor installations are the pulsating torques which originate in the magnitude of the flux generated in a standard 60 cycle alternating current motor which changes 120 times per second. There is a reaction in the motor stator and rotor in response to each change in flux magnitude and this reaction will ultimately be translated into vibrations of the motor frame. These vibrations in the motor frame, as well as those originating from other sources such as the forces attendant to the weight of the motor and the load driven by the motor, create a combination of torsional, axial and radial stresses.

It is very desirable, if not essential, to isolate these stresses or vibrations from the supporting structure in order to provide a statisfactorily quiet motor installation. Vibration isolating motor mounts for accomplishing this are disclosed, for example, in U. S. Pat. Nos. 2,840,329, 2,904,289 and 3,235,207, all assigned to General Electric Company, assignee of the present invention.

Such mounting arrangements have as a prime objective, the provision of a resilient mount which isolates the various vibrations of the motor frame from the supporting structure or base. As discussed generally above one of the prime sources of such vibrations are the pulsating reaction torques caused by the changes in flux magnitude. In many applications for small electrical motors the reaction torque produced in the stator will, on occasion, suddenly become rather high. Therefore it is necessary that the resilient mounting arrangement be capable of absorbing these sudden high torque forces without failure. At the same time it is highly desirable that the resilient mounting arrangement be made as simple and compact as possible, not only to control the amount of space occupied by the motor and its mount but to control the cost. Since there are many thousands of motor installations each year, any increase in the cost of the mounting arrangements, as a result of greater size or complexity, will also be multiplied by the many thousands of separate installations.

Accordingly it is an object of the present invention to provide an improved resilient motor mounting arrangement.

It is another object of the present invention to provide a resilient motor mounting arrangement for effectively limiting the transmission of vibration and noise producing forces from the dynamoelectric machine during operation to the supporting structure, which arrangement has improved torque absorbing capabilities and yet is simple and compact in construction.

SUMMARY OF THE INVENTION

In carrying out the objects of the present invention, in one form thereof, I provide an improved mounting arrangement for rotating machine including an annulus of resilient material having an inner region forming a bore with the plurality of spaced apart recesses extending outwardly therefrom. I also provide a rigid member adapted, in an assembled position, to be disposed at least partly within the bore and in engagement with the rotating machine. The rigid member is formed with a plurality of spaced apart tabs, each of the tabs being received in a corresponding one of the recesses and having opposed lateral surfaces for engagement with the resilient material forming opposite sides of the corresponding one of the recesses. At least some of the tabs are nonplanar to increase the effective length of their lateral surfaces within the corresponding recesses.

The subject matter which I regard as my invention is particularly pointed out and distinctly claimed in the concluding portion of this specification. My invention itself, however, both as to organization and method of operation, together with further objects and advantages thereof may be best understood by reference to the following description taken in connection with the accompanying drawings.

BRIEF DESCRIPTION OF THE DRAWINGS

FIG. 1 is a partial end view of a small electric motor incorporating one form of my improved motor mounting arrangement;

FIG. 2 is a fragmentary side elevational view, partly in cross section, of the motor of FIG. 1;

FIG. 3 is an exploded view in perspective of one form of the resilient mount of the invention shown with an end structure upon which the resilient mount is assembled;

FIG. 4 is a plan view of another form of rigid member useful in the resilient mounting arrangement of the present invention;

FIG. 5 is a plan view of yet another rigid member useful in the resilient motor mounting arrangement of the present invention;

FIG. 6 is a plan view of still another rigid member useful in a motor mounting arrangement in accordance with the present invention; and FIG. 7 is a cross-sectional view of the rigid member of FIG. 6 generally as seen along line 7—7 in FIG. 6.

DESCRIPTION OF THE PREFERRED EMBODIMENTS

Referring now particularly to FIGS. 1–3, by way of exemplification, a preferred embodiment of the present invention is illustrated in connection with a small alternating current induction electric motor 10 of the type intended for domestic or office use such as, blower motors for room air conditioners, for instance.

For simplicity of illustration, only one end of the motor and its supporting structure has been shown, but it is understood that the other end may be similar in construction. In the exemplification, the motor has a stator (not shown) suitably secured to a pair of end shields 11. Briefly, end shield 11 conveniently may be formed of cast aluminum or other suitable material which is provided with a number of openings 11a to allow free passage of air to the interior of the motor for cooling and which is attached to the motor casing 12 by suitable nut and bolt arrangements 13.

The center of each end shield 11 may be provided with a hollow axially extending hub 14 in which is cast a suitable generally hollow bearing frame 15 having a sleeve bearing 16 firmly attached to its inner bore. The rotor shaft 17 is rotationally received in the bearing 16 and extends outwardly through the hub at least at the one end illustrated. The bearing frame 15 forms a lubricant reservoir for storing lubricant for the bearing 16 and may be filled with a suitable oil impregnated material 18 such as felt, for instance. The interior of the hub 14 may be provided with a felt liner 19 for returning lubricating oil from the hub to the reservoir and a washer like oil slinger 20 may be closely mounted about the shaft 17 for rotation therewith within the hub 14 to assist this oil return.

The exemplification stationary motor support for purposes of illustrating my invention is in the form of a generally U-shaped mounting base 21, fabricated from steel or the like. The base includes a pair of spaced apart upright sections 22 integrally joined together at the lower end, as seen in the drawings, by longitudinal section 23 for attaching the base to the equipment with which the motor is to be employed. Each of the upright sections 22 is provided at its top, as viewed in the figures, with a smoothly curved or arcuate edge 24 and a pair of attachment ears 25, one on each side of the arcuate edge.

The improved motor mounting arrangement for limiting the transmission of vibration and noise generating forces from the motor frame to base 21, as embodied in the exemplification of FIGS. 1-3 inclusive, includes a motor mounting member or structure 26 having an annulus 27 of a resilient material. The annulus 27 preferably is of a single piece construction, preferably integrally formed of a molded synthetic rubber material or other suitable shear resilient material which has excellent fatigue and endurance qualities. A ring 28 of suitable material such as steel is positioned around the outer circumferential surface of the annulus 27 and preferably may be bonded to the annulus. The ring is generally channel shaped, having raised outer portions 30 and a recessed inner portion 31, all of which extend circumferentially around the annulus. Additionally the ring is split, as at 32, so that the mounting member may be compressed somewhat when in use. As best seen in FIG. 2 the arcuate edge 24 of upright section 22 fits within the recessed inner portion 31 of the ring 28 and relative axial movement between the mounting member and the upright section 22 is prevented by the raised outer portions 30.

A pair of curved flexible mounting straps 33 are mounted about the attachment ears 25 and extend around the upper portion of the ring 28. Where the straps come together they are provided with out turned ears 34 which are joined by some suitable means such as bolt 35 and nut 36, by which the straps are drawn tight to firmly connect the motor mounting member 26 to the frame 21.

The radially inward portion of the annulus 27 forms an axially extending bore 37 having a first portion 37a with a relatively smooth surface of a diameter which is substantially the same or slightly smaller than the hub 14 of the motor end shield 11. Thus when the mounting member 26 is positioned about the hub 14, the surface of the resilient material forming bore portion 37a will be in firm engagement with the outer circumferential surface of hub 14 and preferably will be slightly compressed. Axially adjacent the bore portion 37a the annulus 27 includes a second bore portion 37b formed by a number of generally radially extending, spaced projections 38 which preferably do not extend radially inwardly as far as the surface of the bore portion 37a. Formed between the projections 38 are a plurality of spaced apart recesses 39. The recesses extend axially of the annulus only so far as generally circumferentially extending wall 40. The side walls 41 of the projections 38, in the unstressed condition of the annulus, substantially are uniformily spaced apart so that the recesses 39 are of a generally uniform width. When the annulus 27 is mounted about the hub 14, the portion thereof forming bore portion 37a will fit tightly about the hub and will be somewhat compressed; however, the radially inner walls 42 of the projections 38, forming bore portion 37b, will be slightly spaced from the hub or just be in contact with the hub, without any substantial radial compression.

The mounting arrangement also includes a generally annular, rigid member 45 which includes a flat end wall 46 and a generally cylindrical flange 47 extending axially from the end wall 46. The center of end wall 46 is formed with an opening 48 to receive shaft 17 and may be formed with a second inwardly extending flange 49 surrounding it. Spaced circumferentially around the edge of flange 45 remote from the end wall 46 are a number of tabs 50 and, if desired, a number of tabs 51. The tabs 51 extend substantially radially outwardly from the edge of flange 47 while the tabs 50 are nonplanar. In the exemplification of FIGS. 1-3 each of the tabs 50 is bent to have a first section 52 thereof which extends radially outward from the flange 47 and a second section 53 angled with respect to the first section so as to extend generally parallel to and spaced from the flange 47.

As best seen in FIG. 2, the rigid member 45 is mounted about the end of the hub 14 with the inner surface of flange 47 snugly engaging the outer surface of the hub 14. Each of the tabs 50 and 51 is received in a corresponding one of the recesses 39 with the opposed lateral surfaces 54 and 55 of the tabs 50 and 51 respectively engaging the side walls 41 of the projections, and with the tabs 50 and 51 engaging circumferentially extending wall 40. The nonplanar configuration of the tabs 50 increases the effective length of the lateral surfaces 54 which are received in the corresponding recesses.

The edge of flange 49 preferably engages oil slinger 20, which rotates with shaft 17. Any lubricating oil running out along shaft 17 will be forced outwardly by slinger 20 and absorbed by liner 19 for return to the reservoir. A ring 56 of resilient material is compressed between wall 46 and the end of hub 14 which prevents any oil leakage around the end of the hub.

The straps 33 snugly mount the outer periphery of the motor mount 26 to the upright section 22 of mounting base 21 with the outer portions 30 of ring 28 preventing axial movement of the mounting member 26 relative to the base 21. The snug engagement between flange 47 and hub 14 plus the snug engagement of the bore portion 37a of resilient annulus 27 with bore 14 substantially prevents axial movement of mounting arrangement. It will be seen that there is no metal to metal contact from the hub 14 to the straps 33 and mounting base 21 so that the mounting arrangement effectively resists transmission of vibrations and other noise inducing forces from the motor to its supporting structure. The low torsional stiffness of the mounting arrangement allows the stator to move or oscillate under these forces while minimizing their transmission to the base. The increased effective length of the lateral surfaces 54 of the tabs 50 spreads the torque forces applied to the annulus 27 over a larger total area and enables the mounting arrangement to successfully carry higher sudden torsional forces than in previous arrangements known to me, such as that shown in U.S. Pat. No. 2,840,329 for instance.

A number of rigid members 45 conveniently may be formed from a strip of suitable material such as steel in a multi station press operation in which first a series of generally circular blanks, having outwardly extending radial projections, are stamped from the strip of material and then subsequently formed to provide the flange 47, the central opening 48, with its flange 49, and the nonplanar configurations of the tabs 50. The projections for forming the tabs 50 may be made of any suitable length to subsequently provide tabs 50 of the desired configuration. However, I have found that some of the tabs 51 may be provided in a straight or planar configuration and thus be shorter than the remaining tabs 50 without any substantial adverse effect on the increased rotational force handling capability of the mounting arrangement. In the initial stamping operation the projections for the tabs 51 are formed adjacent the lateral edge of the elongated strip from which the rigid members are formed. This permits the use of a narrower strip of material than would be possible if all the tabs were nonplanar. The use of a narrower strip reduces the scrap material which, especially in larger volume operations, results in a substantial cost savings.

It will be understood that in many motors the drive shaft extends outwardly from the motor frame or housing only at one end thus, at the other or closed end of such motors, a resilient mounting arrangement similar to that shown in FIGS. 1–3 is provided but with the rigid member being slightly different in configuration in that it will not have the central opening 48. Such a member is indicated at 45a in FIG. 4 and includes a flat annular portion 46a with a plurality of nonplanar tabs 50a and two planar tabs 51a.

FIG. 5 shows another closed end mounting arrangement rigid member 45b which is similar to member 45a in that it has a planar end wall 46b, an axially extending flange 47b and a number of nonplanar tabs 50b. However, there are provided four planar tabs 51b positioned essentially 90° apart around the circumference of the flange 47b. The stampings for members 45b would be formed with the projections for two, oppositely disposed planar tabs 57b adjacent the lateral edges of the strip to allow the use of a minimum width strip. Projections for the other two, oppositely disposed planar tabs 51b of each stamping would be formed closest to the next adjacent stampings along the strip. This would permit the stamping to be placed closer together along the strip. In normal large volume operations each of the strips from which the stampings are formed normally is many feet long. Even a slightly closer spacing of individual stampings can, in such circumstances, result in several additional rigid members being formed from each strip of material. It will be understood that the tab arrangement of the member 47b can be provided in open or shaft end members such as 45, i.e., those having a central opening for passage of the motor shaft.

The nonplanar configuration of the tabs may be provided by tab shapes other than that illustrated in FIGS. 1–5. Another such configuration is shown in FIGS. 6 and 7 wherein a rigid member 45d is provided with a planar end wall 46d, a generally axially extending flange 47d, and a central opening 48d surrounded by central axially extending flange 49d. A plurality of spaced apart generally radially projecting tabs 50d and 51d project generally radially outwardly from the edge of the flange 47d *remote from the end wall 46d*. The tabs 51d may be planar as with the corresponding flanges in the previously discussed rigid members; however, the tabs 50d are smoothly curved in order to increase the effective length of their lateral edges rather than being relatively sharply bent in the manner illustrated in the previously discussed rigid members. A bead 56 of resilient material is positioned at the juncture between the end wall 46d and the flange 47d. This material is forced into tight contact with the corresponding corner of hub 14 when the rigid member is placed about such a hub to provide a oil seal thus assuring that no oil will flow out between the hub and the flange.

While in accordance with the Patent Statutes I have described what at present is considered to be the preferred embodiments of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A resilient mounting arrangement for a rotating machine including: a body of resilient material having an inner region forming a bore with a plurality of spaced apart walls forming opposite sides of spaced apart recesses extending outwardly from the bore; a rigid member adapted in an assembled position to be disposed at least partly within the bore and in engagement with the rotating machine; said rigid member being formed with a plurality of spaced apart tabs; each of said tabs being spaced apart peripherally around the rigid member and being received in a corresponding one of the recesses and having opposed lateral surfaces for engagement with the resilient material forming walls at the opposite sides of the corresponding one of said recesses; at least some of said tabs being nonplanar and having a generally axially extending section to increase the effective length of their lateral surfaces within the corresponding recesses, the oppositely facing lateral surfaces of the generally axially extending section of each of said at least some of the tabs being in force transmitting relationship with the walls that form opposite sides of an associated recess.

2. A mounting arrangement as set forth in claim 1 wherein each of said at least some of said tabs is configured to have two sections angled with respect to each other.

3. The mounting arrangement of claim 1 wherein each of the tabs have a free extremity, at least two generally diametrically opposed tabs are substantially planar, and the developed dimension across the rigid member between the free extremities of said at least two diametrically opposed tabs is less than the developed dimension across the rigid member between the free extremities of two generally diametrically opposed nonplanar tabs.

* * * * *